March 16, 1954  A. L. GENUNG  2,672,218
SWINGABLE GROCERY CART HAVING AN OUTWARDLY OPENING SIDE
Filed July 25, 1949  2 Sheets-Sheet 1
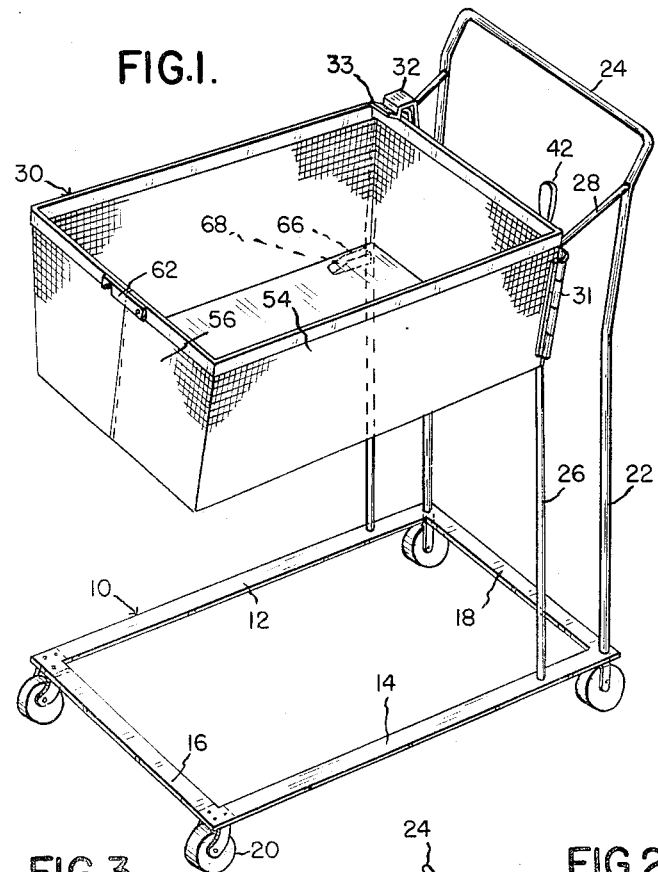
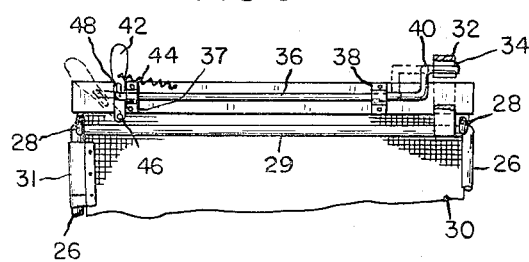
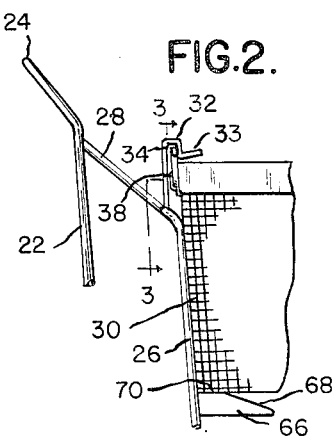
INVENTOR.
ARTHUR L. GENUNG
BY
ATTORNEYS March 16, 1954      A. L. GENUNG      2,672,218
SWINGABLE GROCERY CART HAVING AN OUTWARDLY OPENING SIDE
Filed July 25, 1949      2 Sheets-Sheet 2

INVENTOR.
ARTHUR L. GENUNG
BY
ATTORNEYS

Patented Mar. 16, 1954

2,672,218

UNITED STATES PATENT OFFICE 2,672,218

SWINGABLE GROCERY CART HAVING AN OUTWARDLY OPENING SIDE

Arthur L. Genung, Birmingham, Mich.

Application July 25, 1949, Serial No. 106,587

14 Claims. (Cl. 186—1)

1

The present invention relates to a grocery cart and more particularly to a grocery cart designed to facilitate the handling of groceries at the checking counter.

In most self serve stores wheeled carts containing baskets are provided for the use of the customers. These carts are eventually brought to a long counter where the groceries are removed from the basket and placed upon the counter for checking.

According to the present invention a cart is provided which includes a carriage having a basket secured thereto located at a height somewhat above the checking counter. According to one embodiment of the invention a side or side and end of the basket is movable so that the groceries may be slid from the basket directly to the top of the counter. According to a preferred embodiment of the invention the basket in its entirety is mounted for swinging movement to a position where it overlies the counter. At the same time a side or side and part of an end of the basket is independently hinged thereto for opening movement to provide ready access to the groceries contained in the basket. Preferably, the basket is hinged about an inclined axis so that as it is swung to unloading position it moves downwardly into contact with the upper surface of the counter.

With the foregoing general description in mind it is an object of the present invention to provide a grocery cart adapted to facilitate the unloading and checking of groceries.

It is a further object of the present invention to provide a grocery cart designed to afford ready access to the groceries by the checker.

It is a further object of the present invention to provide a grocery cart having a basket designed to move over the surface of the checking counter and having means controlling such movement in position to be accessible to the checker.

Other objects and features of the invention will become apparent as the description proceeds, especially when taken in conjunction with the accompanying drawings wherein:

Figure 1 is a perspective view of a preferred embodiment of grocery cart.

Figure 2 is a fragmentary end elevation of the latch mechanism.

Figure 3 is a fragmentary section on the line 3—3, Figure 2.

Figure 4:
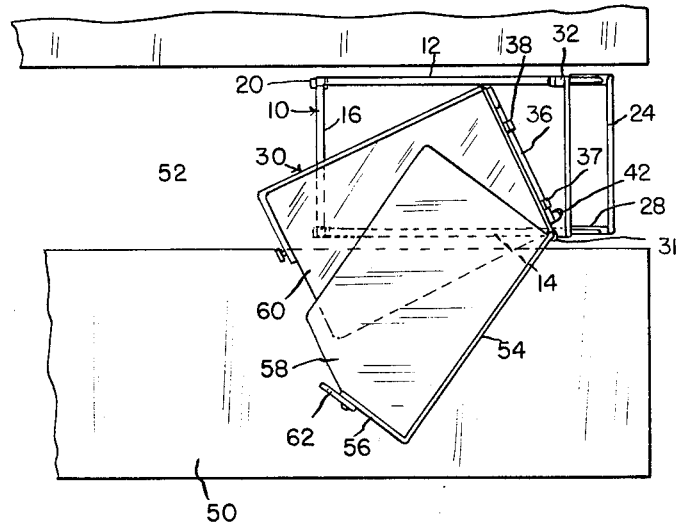
Figure 4 is a diagrammatic plan view illustrating the use of the cart in conjunction with a checker's counter.

Referring now to Figure 1 there is indicated generally at 10 a carriage comprising a lower

2 frame having longitudinal bars 12 and 14, and transverse end bars 16 and 18. At the four corners of the frame thus provided there are casters indicated at 20. Extending upwardly from adjacent the rear end of the frame are corner posts 22 which as illustrated are connected across the top to form a handle 24. Located forwardly from the corner posts 22 are supporting posts 26 which are interconnected at their top by tie portions 28 to the corner posts 22 and by cross bar 29 to each other. This construction provides for rigidity of the parts.

The carriage 10 has a grocery basket indicated generally at 30 secured thereto. Specifically, one of the rear corners of the basket 30 is hinged to the upper portion of one of the posts 26 as indicated at 31. Means are provided for locking the adjacent rear corner to the frame to prevent swinging of the basket about a hinge 31. The latch means comprises a resilient catch 32 carried by bar 29 having a camming lip 33 and a dog retaining recess 34. Slidably mounted along the rear edge of the basket 30 is a rod 36 mounted in suitable guide brackets 37 and 38 having at one end an upturned dog 40 adapted to be retained in the recess 34 of the catch 32. Preferably the rod 36 is of rectilinear cross section as seen in Figure 2 and is retained by the brackets 37 and 38 against rotation.

At the rear of the basket adjacent the hinged corner thereof is an actuating lever 42 provided with a tension spring 44. The lever 42 is pivoted to the basket as indicated at 46 and has an elongated slot 48 therein for receiving a pin located at the adjacent end of the rod 36. As best seen in Figure 3 the lever 42 is movable between the full line position, at which time the dog 40 is retained in the catch 32, and the dotted line position at which time the dog 40 is removed from the catch 32. In operation the lever 42 is moved to the dotted line position to free the dog 40 from the catch, at which time the basket may swing about the hinge 31. As soon as the dog 40 has been released from the catch 32 and swinging movement has been started, the lever 42 may be released and the dog will return to its full line position. Therefore when the basket is swung back to carrying position illustrated in Figure 1, the dog will engage the camming surface 33 of the catch and will move to locked position without requiring manual movement of the lever 42.

Preferably the hinge 31 is inclined slightly from the horizontal as best seen in Figure 1. Accordingly, as the basket 30 swings about this pivot it moves in an inclined plane. Since the basket in its carrying position is located slightly above the upper surface of the checking counter 50 illustrated in Figure 4, movement of the basket in the inclined plane results in the basket coming to rest on the top of the counter.

The lever 42 is located adjacent the left hand side of the cart so that when the cart is introduced into an aisle-way 52 adjacent the counter 50, the checker standing behind the counter can reach across the counter and grasp the lever 42. Pulling the lever 42 toward the checker first releases the dog 40 from the catch. Due to the inclination of the hinge 31, the basket will tend to swing by gravity toward the counter. This movement may be assisted to the extent required by continued pressure on the lever 42.

The basket is designed so that substantially complete access may be had to its contents. Means for accomplishing this purpose comprises a hinged side 54 and preferably a portion 56 of the end of the basket opposite to the hinged end. Furthermore, the hinged side 54 and hinged end portion 56 preferably are secured to a slidable bottom portion 58 which is slidable over the bottom 60 fixed to the basket 30. A suitable latch indicated generally at 62 is provided for retaining the hinged side and end portion of the basket in closed position and again, the latch 62 is in position to be released by the checker standing behind the counter 50.

Inasmuch as the basket 30 is subjected to heavy loads in use it is fully expected that over a period of usage it will develop some distortion and particularly that the hinge structure 31 may become loose. In order that this will not impair continued satisfactory use of the cart, means are provided for supporting the rear corner of the basket opposite to its hinged corner and this means is illustrated in Figure 2 as comprising a support or rest 66. The rest 66 has an inclined camming surface 68 and a horizontal support surface 70. The horizontal support surface 70 is spaced from the catch 32 a predetermined distance and will have the result of guiding the opening end of the basket into proper relation with the catch 32.

The hinge 31 may serve the dual purpose of swinging the basket as a whole and independently hinging the side 54, end portion 56 and bottom portion 58 for movement of the basket proper.

It will be seen that the present arrangement greatly facilitates the work of the checker and further relieves the customer from handling the groceries after the cart has been moved into position adjacent the counter.

Figure 5:
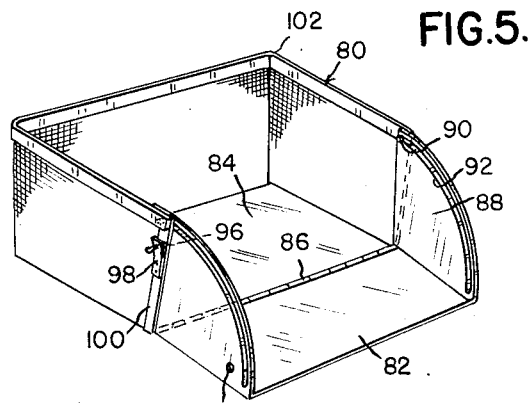
Figure 5 is a perspective view of a second embodiment of the present invention.

Referring now to Figure 5 there is illustrated a somewhat different embodiment of the invention in which the basket 80 is illustrated as provided with a side portion 82 hinged to the bottom 84 of the basket by the hinge indicated at 86. Arcuate side plates 88 are carried by the hinged side 82 and may be guided by pins 90 projecting through arcuate slots 92 formed in the plates 88. One or both of the plates 88 may be provided with a pin receiving opening 94 adapted to receive a latch pin 96 carried by a leaf spring 98 secured to one of the corner posts 100 of the basket. The pin 96 extends through a suitable opening provided in the post 100.

It will be appreciated that the basket 80 may be mounted on a cart such as shown at 10, and may if desired be fixedly carried by the cart. Alternatively, the basket 80 may if desired be provided with a hinge mounting at one corner thereof for mounting the basket for swinging movement relative to the cart in the same manner as the basket 30 illustrated in Figure 1. In this case, the hinge would preferably be provided at the corner indicated at 102 so that when the basket was swung over the counter the hinged side would be facing the checker.

Figure 6:
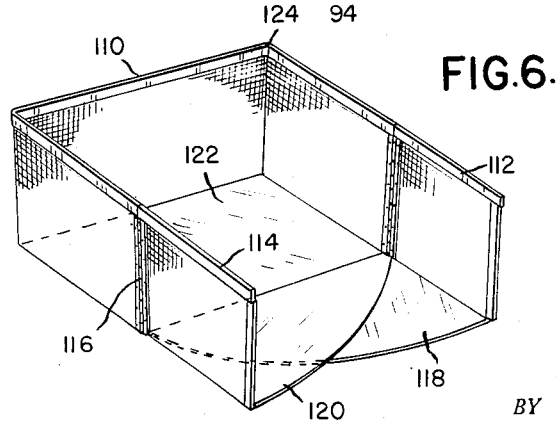
Figure 6 is a perspective view of a third embodiment of the present invention.

Referring now to Fig. 6 there is illustrated a modified construction of the basket. In this case the basket 110 is provided with two independently hinged side portions 112 and 114, each of these side portions being hinged at a corner of the basket as indicated at 116. Moreover, the side portions 112 and 114 are each provided with floor portions 118 and 120 respectively, which are adapted to slide over the fixed floor portion 122 of the basket. Again, the basket 110 may be fixed to a cart such as indicated at 10 in Figure 1 or if preferred, may be hinged thereto in the same manner as the basket 30 illustrated in Figure 1. If hinged to the cart the hinge will of course be provided at the corner 124 so that when the basket has been swung over the counter the independently hinged side portions 112 and 114 will face the checker.

The drawings and the foregoing specification constitute a description of the improved grocery cart in such full, clear, concise and exact terms as to enable any person skilled in the art to practice the invention, the scope of which is indicated by the appended claims.

What I claim as my invention is:

1. A grocery cart comprising a carriage, a grocery basket on said carriage at a level slightly above the level of a counter, pivot means at one corner of said basket mounting said basket for swinging in a generally horizontal plane from carrying position over the carriage to unloading position at least partly over the counter, releasable latch means at an adjacent corner of the basket to retain it against swinging, and a latch actuator located adjacent the pivot means.

2. A grocery cart comprising a carriage, a grocery basket on said carriage at a level slightly above the level of a counter, pivot means at one corner of said basket mounting said basket for swinging in a generally horizontal plane from carrying position over the carriage to unloading position at least partly over the counter, releasable latch means at an adjacent corner of the basket to retain it against swinging, and a rest on said cart for the corner of the basket adjacent its pivot corner, said rest having a camming surface to raise the engaged corner of the basket as it is swung to carrying position.

3. A grocery cart comprising a wheeled carriage adapted to be moved to position one side of said carriage alongside a checking counter, a basket on said carriage located in normal position over said carriage at a height above that of the counter, a hinge connection between said carriage and basket, said hinge connection having a generally vertical hinge axis and being located adjacent a corner of the basket adjacent to the counter to permit swinging of said basket from normal carrying position over the carriage to a checking position in which it partly overlies the counter, a latch including an element carried by said carriage and an element on said basket, said latch being located at the corner of said basket transversely across the carriage from the hinge connection, and a latch release actuator having an operating handle located adjacent the said hinge connection.

4. A cart as defined in claim 3, one of said latch elements comprising a spring catch with a camming portion engageable by the other element upon swinging of said basket to carrying position to provide latching of said basket by a simple swinging movement, said other element being slidable transversely out of said spring catch to release said latch.

5. A cart as defined in claim 4, and spring means connected to said other latch element effective to restore it to latching position upon release of said handle.

6. A grocery cart comprising a wheeled carriage adapted to be moved to position one side of said carriage alongside a checking counter, a grocery basket on said carriage having a floor and spaced side walls and end walls, said basket being located in normal position over said carriage at a height above that of the counter and with one side wall disposed alongside the counter, a hinge connection between said carriage and basket, said hinge connection having a substantially vertical hinge axis and being located adjacent a corner of said basket adjacent to the counter, thereby to permit swinging of said basket from normal position over said carriage to a checking position in which said basket partly overlies the counter, said one side wall being hinged to said basket for outward swinging movement with respect thereto to expose the contents of said basket for sliding lateral movement from said basket to the counter, and releasable holding means operative to retain said basket in normal position over said carriage.

7. A grocery cart as defined in claim 6, said one side wall being hinged for swinging movement outwardly of said basket about the hinge connection between said carriage and basket.

8. A grocery cart as defined in claim 7, said one side wall having a floor secured thereto and movable over the floor of said basket.

9. A grocery cart as defined in claim 6, said one side wall being hinged to said basket about a horizontal axis extending along a bottom edge of said one wall to provide a generally horizontal transfer surface connecting the floor of said basket to the counter.

10. A grocery cart comprising a wheeled carriage adapted to be moved to position one side of said carriage alongside a checking counter, a grocery basket on said carriage located in normal position over said carriage at a height above that of the counter, a hinge connection between said carriage, and basket, said hinge connection having a substantially vertical hinge axis and being located adjacent a corner of said basket adjacent to the counter, thereby to permit swinging of said basket from normal position over said carriage to a checking position in which said basket partly overlies the counter, the axis of said hinge connection being inclined slightly from the vertical to cause said basket to move downwardly on to the counter as it is swung thereover, and releasable holding means operative to retain said basket in normal position over said carriage.

11. A grocery cart comprising a wheeled carriage adapted to be moved to position one side of said carriage alongside a checking counter, a grocery basket on said carriage located in normal position over said carriage at a height above that of the counter, a hinge connection between said carriage and basket, said hinge connection having a substantially vertical hinge axis and being located adjacent a corner of said basket adjacent to the counter, thereby to permit swinging of said basket from normal position over said carriage to a checking position in which said basket partly overlies the counter, releasable holding means operative to retain said basket in normal position over said carriage, said holding means comprising a latch having interengaging elements carried by said carriage and basket respectively, said latch being located at the corner of said basket tranversely across said carriage from said hinge connection, and a latch release actuator connected to one of said elements and operative to release said latch to permit swinging of said basket to a checking position overlying the counter.

12. A grocery cart comprising a wheeled carriage adapted to be moved to position one side of said carriage alongside a checking counter, a grocery basket on said carriage located in normal position over said carriage at a height above that of the counter, a hinge connection between said carriage and basket, said hinge connection having a substantially vertical hinge axis and being located adjacent a corner of said basket adjacent to the counter, thereby to permit swinging of said basket from normal position over said carriage to a checking position in which said basket partly overlies the counter, and releasable holding means operative to retain said basket in normal position over said carriage, said holding means comprising a latch having interengaging elements carried by said carriage and basket respectively, said latch being located adjacent a corner of said basket remote from said hinge connection.

13. A grocery cart as defined in claim 12, including a latch release actuator connected to one of said elements and operative to release said latch to permit swinging of said basket to a checking position overlying the counter.

14. A grocery cart comprising a wheeled carriage adapted to be moved to position one side of said carriage alongside a checking counter, a grocery basket on said carriage having a floor and spaced side walls and end walls, said basket being located in normal position over said carriage at a height above that of the counter and with one side wall disposed alongside the counter, a hinge connection between said carriage and basket, said hinge connection having a substantially vertical hinge axis and being located adjacent a corner of said basket adjacent to the counter, thereby to permit swinging of said basket from normal position over said carriage to a checking position in which said basket partly overlies the counter, one of said side walls being hinged to said basket for outward swinging movement with respect thereto to expose the contents of said basket for sliding lateral movement from said basket to the counter, and releasable holding means operative to retain said basket in normal position over said carriage.

ARTHUR L. GENUNG.

References Cited in the file of this patent

UNITED STATES PATENTS

| Number | Name | Date |
| --- | --- | --- |
| 193,723 | Pfleghar | July 31, 1877 |
| 547,552 | Keegan | Oct. 8, 1895 |
| 1,519,073 | Thovson et al. | Dec. 9, 1924 |
| 1,581,352 | Kuen | Apr. 20, 1926 |
| 1,865,618 | Dahlman et al. | July 5, 1932 |
| 2,479,530 | Watson | Aug. 16, 1949 |

FOREIGN PATENTS

| Number | Country | Date |
| --- | --- | --- |
| 354,097 | Great Britain | Aug. 6, 1931 |